United States Patent
Yee et al.

(10) Patent No.: US 12,483,413 B2
(45) Date of Patent: Nov. 25, 2025

(54) TOKEN FOR GENERATING AND DISPLAYING UPDATED AUTHENTICATED TOKEN DATA ON AN ELECTROPHORETIC DISPLAY

(71) Applicant: Capital One Services, LLC, McLean, VA (US)

(72) Inventors: Bryant Yee, Silver Spring, MD (US); Samuel Rapowitz, Roswell, GA (US); Armando Martinez Stone, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 240 days.

(21) Appl. No.: 18/065,027

(22) Filed: Dec. 13, 2022

(65) Prior Publication Data

US 2024/0195631 A1    Jun. 13, 2024

(51) Int. Cl.
*H04L 29/00*    (2006.01)
*H04L 9/32*    (2006.01)

(52) U.S. Cl.
CPC .......... *H04L 9/3234* (2013.01); *H04L 9/3213* (2013.01)

(58) Field of Classification Search
CPC .... H04L 9/3234; H04L 9/3213; H04L 9/0897
See application file for complete search history.

(56) References Cited

U.S. PATENT DOCUMENTS

| | | | | |
|---|---|---|---|---|
| 2013/0086389 A1* | 4/2013 | Suwald | ................... | G06F 21/36 |
| | | | | 713/185 |
| 2018/0285546 A1* | 10/2018 | Greenberg | ............ | H04L 9/0891 |
| 2018/0302227 A1* | 10/2018 | Seegebarth | ........... | H04W 12/06 |
| 2021/0184872 A1* | 6/2021 | Kim | ...................... | H04L 9/3278 |
| 2023/0034169 A1* | 2/2023 | Ferenczi | ............... | H04L 9/0894 |

\* cited by examiner

*Primary Examiner* — Ghazal B Shehni
(74) *Attorney, Agent, or Firm* — Foley & Lardner LLP

(57) ABSTRACT

In certain embodiments, token data may be generated, updated, and presented on a token display of a token. In some embodiments, a communication session may be initiated between a token and a terminal. Authentication data stored on the token may be replaced with updated authentication data. Updated token data may be generated based on updated authentication data. The token data on an electrophoretic display may be replaced with the updated token data.

18 Claims, 6 Drawing Sheets

TOKEN FOR GENERATING AND DISPLAYING UPDATED AUTHENTICATED TOKEN DATA ON AN ELECTROPHORETIC DISPLAY

SUMMARY

As secure digital data is produced and stored at increasing rates, maintaining the privacy and security of electronic information has been of paramount importance. For example, users may now interact with security tokens, both virtual (e.g., password/username combinations or single sign-on tokens) and physical (secure peripheral authentication devices), on a frequent basis for identity verification and protection against misuse. Where security tokens may be misused, hacked, or stolen, security token details may require updating or refreshing to prevent any further misuse. While virtual tokens and corresponding authentication data may be more readily changed when needed, physical tokens may require significant effort, such as generation of a new physical card and subsequent delivery to a given user.

Methods and systems are described herein for novel uses and/or improvements to security token technology. As one example, methods and systems are described herein for generating and displaying rotating token information on a token based on authentication data for communication sessions between a token and a terminal. For example, the system may generate and display user information, a rotating user account number, and rotating authentication details for communication and authentication with the terminal.

Existing physical tokens are generally associated with a single set of authentication details, and any change may require issuance of a new physical token. For example, when a user's physical token details are stolen, a user may need to contact the issuer of a token and verify his or her identity before the issuer manufactures and delivers a new token to the user. This process may require considerable time and cost due to the physical constraints, throughout which the user may be exposed to further security risks while the new token details are being generated. Other physical tokens may generate and display updated authentication data (e.g., a rotating code) continuously, e.g., by using liquid crystal displays that requires constant power through batteries. Additionally, these tokens, due to these power requirements, may have bulky designs that may preclude their use in some applications, such as integrated circuit (IC) enabled cards.

To overcome these technical deficiencies, embodiments disclosed herein include a capacitor capable of powering an electrophoretic display that may display generated token data based on detecting completion of a communication session based on time, location, or signals from a terminal. The token may generate this updated token data based on authentication data for display on the electrophoretic display powered by a capacitor. For example, the system may generate updated authentication data (e.g., by receiving a form of this data from a server connected to the terminal) and, by doing so, enable authentication data to be refreshed after each communication session. Because the electrophoretic display may not require power for maintaining a static display, the system may leverage any energy stored in the capacitor to update the display according to the updated authentication data, even when disconnected from an external power source (e.g., the terminal). By doing so, the system enables a small form-factor token as a full-sized battery and/or cell may not be required, but any needed power may still be delivered to the display and circuitry within the token when required to rotate and display updated authentication details. In one use case, for example, authentication details may be rotated upon termination of communication sessions between a token and a terminal, while minimizing the size of the token. Moreover, by frequently updating such data, the system may mitigate against misuse and theft of authentication information stored on the token.

In some aspects, a token and/or the associated system may include a capacitor. As an example, the system may include a capacitor that may be configured to receive power from a terminal, store power, and provide power to components of the token. In one use case, through the capacitor, the token may operate any associated electronics (e.g., circuitry or displays) even when disconnected from the terminal, while the capacitor enables the token to take on a smaller form-factor as compared to a battery-powered token. The system may include an electrophoretic display that may be configured to present token data (e.g., information that may enable authentication of users of the token). Thus, the system may update and display information dynamically, while requiring low or no power consumption between updates, as the display may require little or no power when static. In this way, for example, the system may continue to display token information while inactive (e.g., disconnected from the terminal), while enabling manual use of displayed data.

In some aspects, the system may initiate a communication session between the token and the terminal. During the communication session, authentication data stored on the token may be transmitted to the terminal, and the token may present token data on the electrophoretic display. For example, the system may transmit encrypted information that includes the user's credentials (e.g., a name, user account authentication information, etc.) to the terminal for validation. Additionally, the token may present this data on the screen, as a backstop for any communication failures (e.g., to enable manual input of token information into the terminal for validation).

After completion of the communication session with the terminal, the system may cause replacement of authentication data stored on the token with updated authentication data. For example, the system may receive updated authentication data from the terminal and store this information in the location of the initial authentication data. Thus, the system may generate rotating authentication information for the user, thereby mitigating fraud and theft of the original authentication information (e.g., by a malicious terminal).

The system may generate updated token data based on the updated authentication data. For example, the system may determine a username, a user account number, and a token expiration timestamp based on the updated authentication data, such that it is in a human-readable format and may be displayed subsequently. The system may replace the token data on the electrophoretic display with the updated token data. For example, the system may update the electrophoretic display to present the updated token data while the electrophoretic display is powered by the capacitor. Due to the electrophoretic nature of the display, the update may not require further power from the terminal to maintain the display of the updated token data. Thus, the user may read and use the updated token data even when the token is disconnected from a terminal.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a,"

"an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
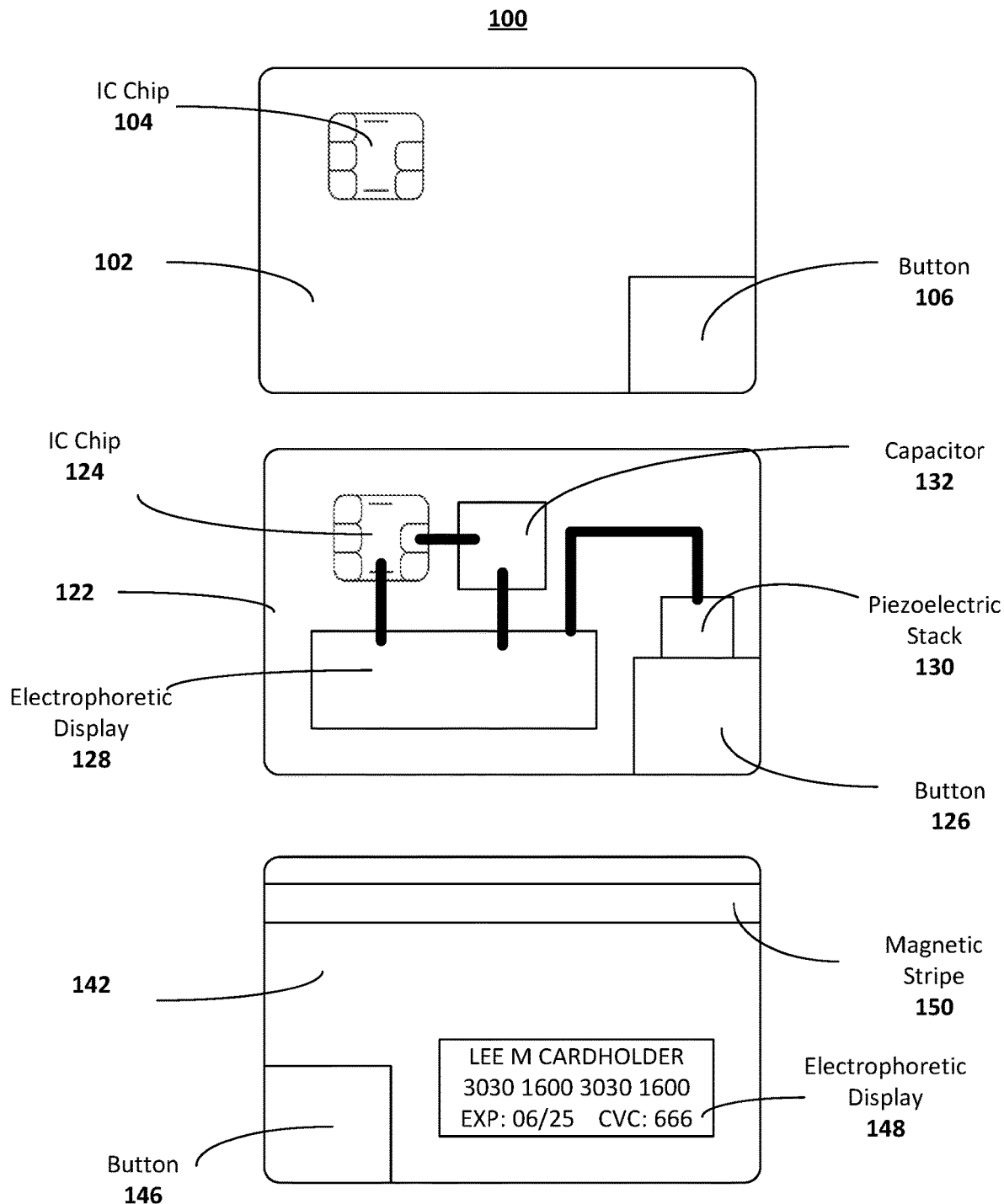
FIG. 1 shows an illustrative diagram of a top, middle, and bottom view of a token with a capacitor, piezoelectric stack and an electrophoretic display, in accordance with one or more embodiments disclosed herein.

FIG. 1 shows an illustrative diagram of a top, middle, and bottom view of a token with a capacitor, piezoelectric stack and a display, in accordance with one or more embodiments disclosed herein. For example, FIG. 1 illustrates top view 102 of token 100, middle view 122 of the planar cross-section of token 100, and bottom view 142 of token 100. Token 100 may include an integrated circuit (IC) chip 104 or 124, which, in some embodiments, may be a smart card, such as an EMV ("Europay, Mastercard, and Visa") chip. By including an IC chip, the token may communicate with and process information (e.g., authentication information) from a terminal through the IC chip. Token 100 may include button 106, which may include mechanical components that improve tactility or functions during activation (e.g., pressing) of the button. As shown in middle view 122, token 100 may additionally or alternatively include capacitor 132, piezoelectric stack 130, and/or electrophoretic display 128. Bottom view 142 demonstrates that the bottom of token 100 may include electrophoretic display 148, button 146, and/or magnetic stripe 150, for example. For example, electrophoretic display 148 may display information such as a token user identifier (e.g., a name of a token user), an expiration date, and a card validation code (CVC). By leveraging an electrophoretic display to present information relating to the token, such as user information and authentication details, the system may update such information and notify the user accordingly, enabling generation and display of updated token data.

In disclosed embodiments In some embodiments, a token may include a card, such as an IC card, wherein an integrated chip may contain or store information, such as information related to a user account, transportation ticket, user, or journey. In some embodiments, a card or a token may include an integrated chip, antenna coil, and/or a substrate. An integrated chip may contain or process information, such as transaction information. The integrated chip may take the form of an EMV chip, smart card or, for example, a chip that enables radio frequency identification (RFID) or near-field communication (NFC), such as in ePassports or transit passes. A substrate (e.g., a layer) may be included in order to provide structural rigidity to the token; in some embodiments, the substrate may be incorporated with the other components of the token itself, such as the antenna. For example, the token may be constructed from plastics, such as polyvinyl chloride, or metals, such as stainless steel. In some embodiments, the token may not be solid and/or may contain holes or transparent regions, and the token may comprise multiple layers. By utilizing a token, many components may be combined to enable multiple functions, such as an IC chip and an electrophoretic display, synergistically, in a manner that allows simultaneous use of all such features or devices.

In disclosed embodiments, a "smart card" may include a card, token, or other instrument that acts as an electronic authorization device, in order to control access to a resource. For example, a smart card may contain identity, financial, contact, public transport, or healthcare information. A smart card may contain an integrated chip, such as an EMV chip, in order to contain this information; this information may be in encrypted form. Smart cards may also include other features, such as buttons, keyboards, fingerprint sensors, buzzers, and speakers, and may be known as "complex smart cards" in these embodiments. In disclosed embodiments, an "EMV-enabled token" may include any token, card, chip or other instrument that utilizes the "Europay, Mastercard, and Visa" technical standard for electronic payments. By utilizing an EMV-type chip, the token may improve security against fraud when compared to obsolete magnetic stripe card transactions-information in these chips may be protected with personal identification numbers (PINs) and may be supplemented with cryptographic algorithms, such as Triple Data Encryption Standard (DES), Rivest-Shamir-Adleman (RSA), and SHA, when providing secure information to a terminal. EMV chips may interface with antennas or coils in a way that enables NFC with payment terminals or other receivers of NFC information.

In disclosed embodiments, the system (e.g., the token) may include a magnetic stripe. In disclosed embodiments, a "magnetic stripe" may include a strip of a magnetic material that may act as storage of information. For example, a magnetic stripe may include a plastic film with embedded magnetic material (e.g., iron filings), and, in some embodiments, magnetic stripe 150 may adhere to the bottom of token 100 as shown in FIG. 1. The magnetic stripe may include data related to the token embedded in the magnetization of the magnetic stripe, as well as authentication data related to a user of the token. For example, the magnetic stripe may include multiple tracks, each of which may include different information. In some embodiments, the magnetic stripe may include information, such as expiration code, service code, token number (e.g., a payment card number or primary account number, or discretionary data). By including a magnetic strip, the token may include information relating to the user for authentication purposes (e.g., in order to allow transactions or identity verification). Information within a magnetic strip may be easy to steal; thus, in some embodiments, information within the magnetic strip may be supplemented by rotating authentication information stored in or about the IC chip, thereby ensuring improved security and theft mitigation for the token.

In some embodiments, the system may include a display, such as electrophoretic display 148, as shown in FIG. 1. For example, the electrophoretic display may be configured to present token data. In disclosed embodiments In some embodiments, electrophoretic displays may include electronic paper, electronic ink, or any other display devices that mimic the appearance of ordinary ink on paper. Electrophoretic displays may include charged pigment particles that may be rearranged using an applied electric field. Thus, as incorporated in a token disclosed herein, an electrophoretic display may be updated using an electric field. In some embodiments, the electrophoretic display may be integrated with circuitry that enables the receipt of data or information and subsequent processing for display on a screen. In some embodiments, a button (e.g., buttons 106, 126 or 146) may activate the display and/or trigger an update of the display. Thus, once the electrophoretic display is updated (e.g., to display updated information related to the token and/or user), the display may maintain the static image of the display with little-to-no power consumption, enabling further use of the displayed information, even when the token is unpowered (e.g., not connected to a terminal). As electrophoretic displays require little electricity, they may be effectuated using a capacitor, rather than requiring a considerably bulkier electrochemical cell or battery for portability.

The system may include token data. In disclosed embodiments, "token data" may include information relating to the token or user of the token. For example, token data may include an identifier of the owner and/or user of the token (e.g., an issuer name, a user name or associated identification numbers). In some embodiments, token data may include information that may be used to authenticate the user, such as an expiration date associated with the user or corresponding account, or a card security code (CSC), such as a card verification value (CVV) or a CVC. By including token data within the system (e.g., in storage associated with the IC chip), the system may store and display information that may enable a user to validate use of the card, such as through a transaction or validation operation. For example, a user may utilize token data that is displayed on the token's electrophoretic display to make a purchase or log into a user account.

For example, token data may include information regarding a user account (e.g., as shown on electrophoretic display 148 in FIG. 1), such as a primary account number (e.g., a 10-16 digit numeric or alphanumeric character string associated with a digital or financial account), associated with the card. Additionally or alternatively, token data may include virtual account numbers. An account number may be an identifier of a user account. For example, an account number may include a string of numbers, letters, or other characters that identify an account. Account numbers may also include, for example, routing numbers for banks, as well as credit card numbers. In some embodiments, account numbers may have between eight and 12 digits and may be unique within a bank or institution. Account numbers may indicate an account type—for example, the suffix of the account number may indicate if a bank account is a checking, savings, or credit card account. For example, an account number may include a credit card number or a virtual credit card number associated with a virtual credit card account.

The system may utilize or include an expiration date (e.g., as shown on electrophoretic display 148 in FIG. 1, marked as "EXP"). An expiration date may be a time, date, or temporal marker after which a user account is no longer in effect. In some embodiments, an expiration date may reflect a date on which a contract or terms between the user and the manager of the user account may expire. For example, credit card accounts may have expiration dates years beyond initial account activation. Expiration dates may prevent fraud or misuse, as user accounts may need to be revalidated before being extended beyond expiration. In some embodiments, an expiration date may be dependent on or calculated from the primary account number and CVV, for example. By generating expiration dates and other token data that may be related to authenticating a user of the token, the system may enable that any transaction using the token may be validated against authentication data.

In disclosed embodiments, authentication data may include data or information that may be used for authenticating use of the token. For example, authentication data may include token data or an encrypted and/or hash form of the token data. For example, authentication data may include a form of an account number, expiration date, CVV code, and/or other security information, which may be encrypted using a DES algorithm. The authentication data may be encrypted via a DES key, for example, and may include other information (e.g., information regarding the encryption standard) that enables a server, terminal, or another device to verify the encrypted information and, therefore, the given transaction or communication session. By storing, receiving and/or generating authentication data, the system may update authentication data (e.g., to produce updated authentication data) and token data (e.g., to produce updated token data) on a rotating basis, such that a validated communication session may not be misused or exploited to fraudulently validate subsequent transactions. By doing so, the system ensures that any stolen or otherwise misused authentication data may not be further reused by malicious entities, enabling for improved security and fraud protection for users of the token.

Authentication data and/or token data may include a CVV. In disclosed embodiments, a "CVV" may include CSCs or CVCs, and may include a series of numbers as a security feature. For example, a CVC may comprise a three-digit number that may be printed on the back of a token (as shown in bottom view 142 in FIG. 1). CVV numbers may improve the security of a token or validation by ensuring that they must be provided or manually entered for transactions where the card may not be present or attached to the terminal, to verify that the holder of the token is carrying out the transaction. In some embodiments, IC chips may generate dynamic CVVs (known as iCVVs), which enable a token to generate rotating security numbers over multiple transactions. By including CVV information as part of authentication data, the system may ensure that it may be rotated, along with other token data, in order to reduce the risk of theft of such information.

The system may utilize an encryption algorithm to encode, secure and/or store token data and/or authentication data. In disclosed embodiments, an encryption algorithm may include asymmetric encryption and/or symmetric encryption. For example, an EMV card/token may include, utilize, or leverage asymmetric encryption algorithms, such as the RSA cryptosystem. In some embodiments, the system may utilize a triple data encryption algorithm (3DES). By utilizing an encryption algorithm, the system may ensure that authentication data stored on the token may be secure, even if stolen by external actors. Asymmetric encryption may require access to a key (e.g., a private key) in order to access authentication data encrypted using a public key. As such, asymmetric encryption may allow information stored on the token to be accessed only by trusted entities (e.g., a payment network or a bank). Thus, by leveraging encryption, the token may protect authentication information from theft or misuse for unintended or malicious recipients of the encrypted data.

The system may use public keys. In disclosed embodiments, a "public key" is a cryptographic code that may allow users to receive cryptographic resources. In some embodiments, a public key may comprise a string of alphanumeric characters, and may be associated with a particular bank, token issuer, or card network, for example. In some embodiments, a public key may be associated with a corresponding private key, for example through an encryption algorithm such as an elliptic curve digital signature algorithm or an RSA algorithm. Use of another user's public key, for example a "receiver" public key, may allow authentication data and other encrypted information to be transferred only to the holder of the corresponding private key, ensuring that information is shared only with authenticators or other trusted parties.

The system may use private keys. In disclosed embodiments, a "private key" may refer to a variable in cryptography that is used to encrypt or sign data. A private key may be associated with a particular network, issuer, or entity related to the security of the token, such as a bank, payment network, or trusted server. In some embodiments, a private key may comprise an alphanumeric string. In some embodiments, a private key may comprise a 256-bit number and may be associated with a public key via an RSA algorithm. By design, entities without access to a private key may not be allowed to access the corresponding authentication information required to authenticate a transaction with the token. Thus, use of asymmetric encryption and, therefore, a private key ensures that authentication data remains secure with those who are intended to access such information.

Figure 2:
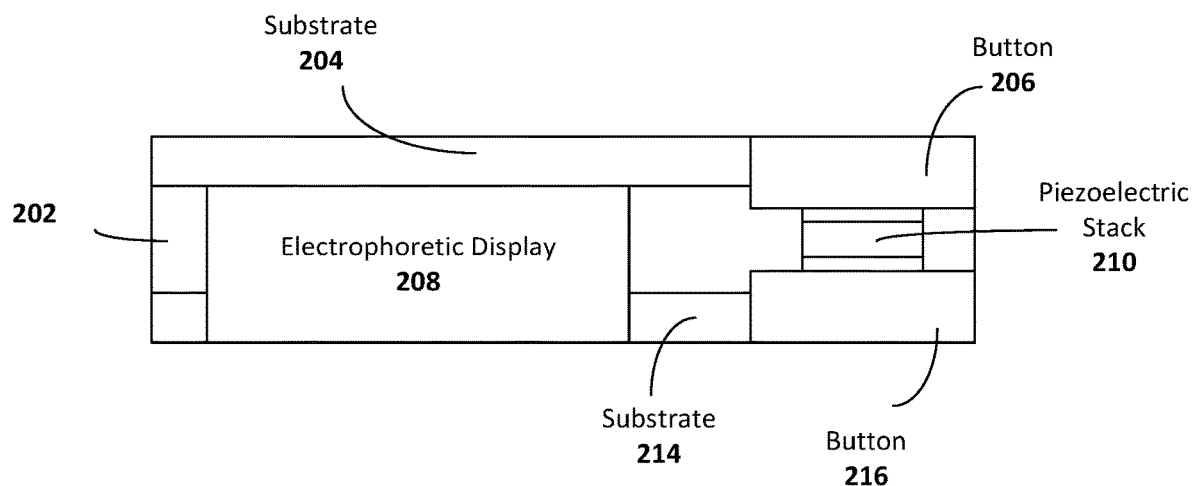
FIG. 2 shows an illustrative diagram of two cross-sectional views of a token with a capacitor, a piezoelectric stack, and an electrophoretic display, in accordance with one or more embodiments.
Figure 2:
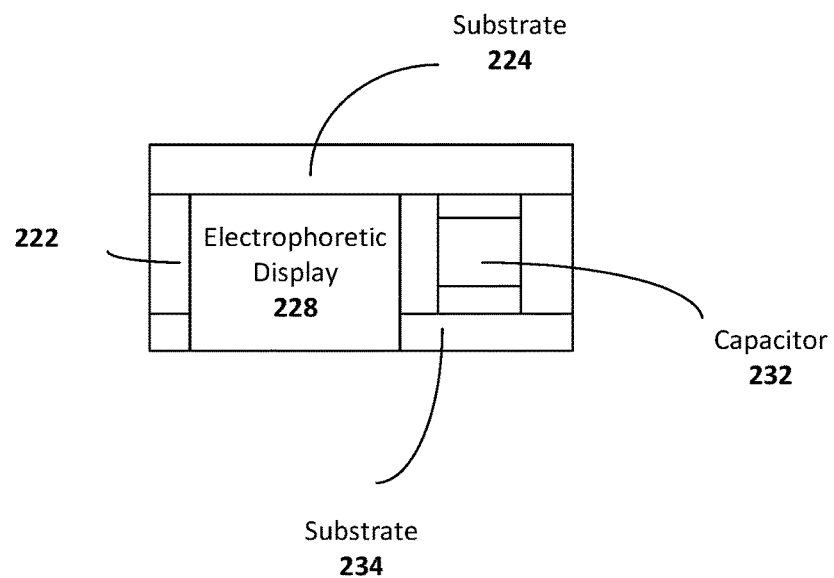

FIG. 2 shows an illustrative diagram of two cross-sectional views of a token with a capacitor, a piezoelectric stack, and an electrophoretic display, in accordance with one or more embodiments. For example, FIG. 2 illustrates lengthwise cross-sectional view 202 and width-wise cross-sectional view 222 for token 200. The cross-sectional views demonstrate lateral and vertical placement of electrophoretic displays 208 and 228, as well as piezoelectric stack 210 and capacitor 232. Additionally or alternatively, as shown in FIG. 2, token 200 may include substrates 204, 214, 224, or 234, to provide structural integrity for the token. Token 200 may include buttons 206 or 216, which may enable control of the electrophoretic display and/or the operations performed by the IC chip.

As shown in FIG. 2, token 200 may include a piezoelectric element. For example, the token may include a button that is connected to a piezoelectric element. The piezoelectric element may be configured to generate, upon activation of the button, an output voltage that triggers the replacement of the authentication data. The authentication data may be replaced with updated authentication data based on the generation of the output voltage. In disclosed embodiments, a "piezoelectric element" may include a material that produces a voltage or electric field upon application of mechanical stress, pressure, or force. For example, a piezoelectric element may include a piezoelectric crystal, such as quartz, or ferroelectric crystals, such as zinc oxide. A piezoelectric element may act as a piezoelectric sensor, wherein a signal may be produced upon pressing. In some embodiments, a piezoelectric element may be arranged with respect to one or more buttons such that, when activated, the button causes the piezoelectric element to experience stress and, accordingly, produce an electrical signal (e.g., an output voltage). In some embodiments, the piezoelectric element may be included in or arranged using a piezoelectric stack, where the piezoelectric element may be placed between electrode materials, as shown on piezoelectric stack 210 in FIG. 2. The electrical signal may be detected by circuitry within the IC chip or the electrophoretic display. In some embodiments, the system may, upon activation of the button, cause the piezoelectric element to produce an output voltage that triggers replacement of authentication data or further replacement of token data on the electrophoretic display. By doing so, users may rotate authentication details upon request (i.e., upon activation of a button), thereby enabling users to protect token information where there is, for example, higher risk of fraud. For example, a user that makes a purchase at an untrusted or unknown vendor may choose to activate the button and generate new token information to prevent any theft or fraud that may occur otherwise as a result of the untrusted transaction.

Token 200 may include one or more buttons, which may be connected to a piezoelectric element. In disclosed embodiments, a "button" may include any mechanical mechanism to control a machine or process. For example, the system may utilize a button to activate a piezoelectric element for further signaling to the IC chip or the electrophoretic display, as discussed above. In some embodiments, the token may include multiple buttons, as shown by buttons 206 and 216 in FIG. 2, in order to provide grip to the user on both sides of the token. The material of the buttons may be matte, to improve finger grip, or may be similar to the token. In some embodiments, the token may include only one button (e.g., at the top or bottom of the card), such that the piezoelectric stack may rest against a token substrate. In some embodiments, the button may be on the side of the token or away from the sides of the token, to improve grip position and ergonomics. Activation of the button may further cause the electrophoretic display to be updated to present updated token data while the electrophoretic display is powered by the capacitor. By including a button, the token may signal to a user where to press in order to activate the piezoelectric element and produce the output voltage.

As shown in FIG. 2, the token may include an energy storage device, such as capacitor 232. In disclosed embodiments, an "energy storage device" may include any device, machine, or medium for capture of energy produced or received at one time for use at a later time. For example, an energy storage device may include an electrochemical cell, a battery, capacitors, supercapacitors, thermal storage, mechanical storage (e.g., springs), or any other mechanism for storing energy. By including an energy storage device, token data and/or authentication data may be generated, rotated, and/or displayed even when the token may not be powered by any other devices (e.g., a terminal). As such, an energy storage device enables the system to execute fraud prevention procedures, such as generating and displaying updated authentication data, even when disconnected from an electricity network.

The token may include a capacitor, such as capacitor 232, which may be configured to receive power from a terminal, store power, and provide power to components of the token. In disclosed embodiments, a capacitor may include a device that stores electrical energy in an electric field. For example, in some embodiments, a capacitor may include two electrical conductors in the form of plates or surfaces (e.g., electrodes) separated by a dielectric medium (e.g., an insulator). In some embodiments, electrodes may include metals, ceramics, or electrolytes in foil, thin-film, or bead form. Insulating materials for the separator may include glass, ceramic, plastic film, paper, mica, air, and oxide layers. In some embodiments, the capacitor may include a switch that enables control of charging and discharging the electrodes. In some embodiments, the capacitor may be of a flat, planar form, with the plane in the plane of the token, as shown in FIG. 2 for capacitor 232. Additionally or alternatively, the capacitor may have a planar form and aligned perpendicularly or tilted to plane of the token. By including a capacitor, the system may provide electrical power to components, such as the electrophoretic display or IC chip, even when the token is disconnected from a power source, as discussed above for energy storage devices. By utilizing a capacitor, the token may be reduced in size of the token when compared to other electrical energy sources, such as batteries or electrochemical cells, enabling improved portability, weight, and cost for the token.

In some embodiments, the system may utilize a supercapacitor for power supply to the electrophoretic display and/or the IC chip. For example, the system may include a capacitor that is a supercapacitor, which may be configured to provide power to the electrophoretic display when the token is disconnected from the terminal. In disclosed embodiments, a "supercapacitor" (also known as an ultracapacitor) may include a capacitor with a higher capacitance value than standard capacitors, but with lower voltage limits. In some embodiments, a supercapacitor may include an electrical double layer, for example, using carbon electrodes and an electrolyte, leading to a small separation of charge and, as such, to a high capacitance. In some embodiments, a supercapacitor may include electrochemical pseudocapacitors, which may incorporate metal oxide or conducting polymer electrodes. As supercapacitors may store more energy per unit volume than standard capacitors, they are more suitable for applications requiring rapid charge/discharge cycles, rather than long-term energy storage. Thus, as the electrophoretic display requires electricity mainly only for updating the display, supercapacitors may be leveraged within the token disclosed herein to provide electricity only during the relatively quick display update process, enabling portable use of the electrophoretic display. When the capacitor is discharged and away from a terminal, the electrophoretic display may maintain the original display even with no further power supply.

Figure 3:
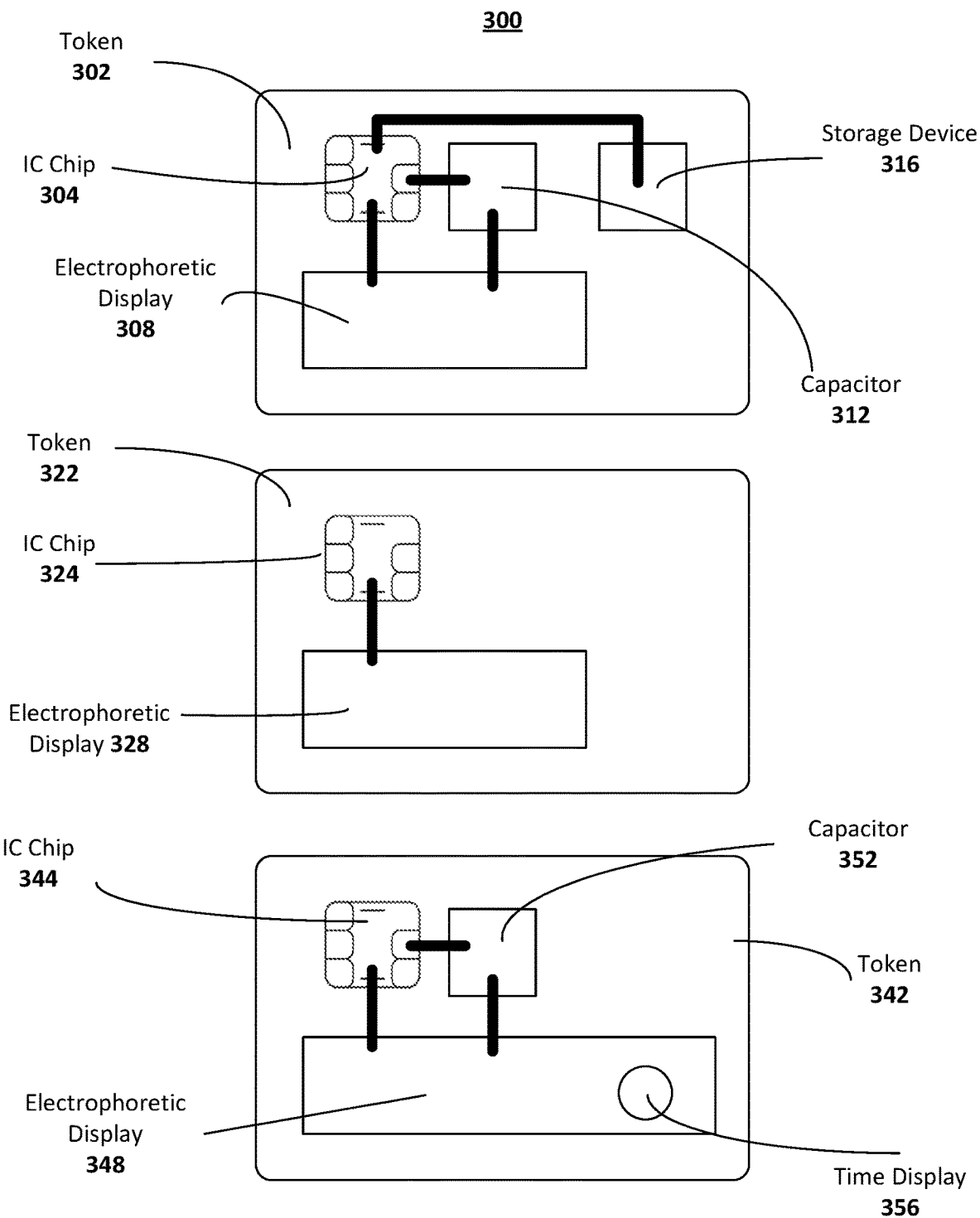
FIG. 3 shows an illustrative diagram of tokens with electrophoretic displays with various features, in accordance with one or more embodiments.

FIG. 3 shows an illustrative diagram of planar cross-sections 300 of tokens with electrophoretic displays with various features, in accordance with one or more embodiments. For example, FIG. 3 demonstrates token 302, which includes IC chip 304, capacitor 312, electrophoretic display 308, and storage device 316, where storage device 316 may store authentication data and/or token data. Token 322, demonstrated in FIG. 3, may include IC chip 324 and electrophoretic display 328. Token 342 may include IC chip 344, capacitor 352, electrophoretic display 348, and time display 356 within the electrophoretic display. Time display 356 may, for example, describe the length of time expected until token data on electrophoretic display 348 may be updated/rotated. Illustrative connections between components (whether they are power connections, data connections and/or both) are shown in dark black lines on FIG. 3.

Token 302, as depicted in FIG. 3, demonstrates an embodiment with storage device 316 connected to IC chip 304. IC chip 304 may be connected to capacitor 312 and/or electrophoretic display 308. Capacitor 312 may be connected to electrophoretic display 308 as well. Token 302 may include a system that may generate authentication data (e.g., in response to a refresh signal or voltage signal originating from an attached terminal or a button). To generate this authentication data, the system may utilize storage device 316, for example, storage device 316, which may be connected to IC chip 304 through a data connection. Upon a decision to cause the replacement of authentication data with updated authentication data, the system may retrieve updated authentication data that may already be stored in storage device 316 (e.g., as an array of encrypted information through the data connection). Thus, by including storage device 316, the system may generate updated authentication data using pre-stored information within a storage device 316. Thus, the system may generate authentication data even when disconnected from a terminal or another source of data (e.g., through power from capacitor 312), thereby enabling manual rotation of authentication details.

In some embodiments (e.g., as shown by token 322 in FIG. 3), the system may include IC chip 324 and electrophoretic display 328. IC chip 324 may be connected to electrophoretic display 328 with a data connection and/or a power connection. For example, IC chip 324 may receive information from the terminal (e.g., a signal voltage signaling the termination of a communication session). IC chip 324 may, in some embodiments, request and/or receive updated authentication data and/or token data from the terminal. IC chip 324 may transmit a command to electrophoretic display 328 to display this updated authentication data and/or token data, while using power supplied by the terminal. Thus, the system may enable rotation of authentication data and subsequent display of updated token data when powered by the terminal. For example, the system may generate the updated authentication data and the updated token data and display this information on the electrophoretic display while connected to power, and the token may continue to maintain a display of this information even when unpowered as a result of the non-volatile nature of the electrophoretic display. By doing so, the system may receive updated authentication data directly from a server or network associated with a trusted entity linked to the terminal (e.g., from a bank that issued the card). Thus, the system may ensure that, after each transaction, the authentication data may be rotated or changed according to rules from the terminal or server, ensuring improved security, control, and flexibility for the issuers of the token.

In some embodiments (e.g., as shown by token 342 in FIG. 3), the system may include IC chip 344, capacitor 352, and electrophoretic display 348. Electrophoretic display 348 may include time display 356. Additionally, IC chip 344, in some embodiments, may include a security module. IC chip 344 may receive information from the terminal (e.g., a signal voltage) and may transmit this information through a data connection to electrophoretic display 348. Additionally or alternatively, IC chip 324 may transmit power from the terminal to capacitor 352 for charging or may receive power from capacitor 352 during discharging. Additionally, electrophoretic display 348 may receive power directly from IC chip 344 (e.g., from the terminal), or may receive power directly from capacitor 352 through a power connection. Thus, token 342 may operate using power from capacitor 352 even when disconnected from a terminal, and token 342 may utilize this power to perform operations through IC chip 344 (e.g., generating and updating authentication data and token data) or to update electrophoretic display 348. In some embodiments, generation of the authentication data may occur internally on IC chip 344, using an integrated security module, for example. The security module may generate encrypted authentication data using relevant public keys using key generation and encryption algorithms, for example, without the need for substantial data storage. Thus, by utilizing a security module that may be powered by a capacitor, authentication data from the user may be generated portably and securely. Any transactions may be double-checked by a server connected to the terminal with respect to the embodied algorithms used for this generation of data. Thus, the system enables secure rotation of authentication data for users of the tokens even when disconnected from a terminal, with limited data storage required, enabling smaller, lighter, and more cost-effective designs for the token.

Figure 4:
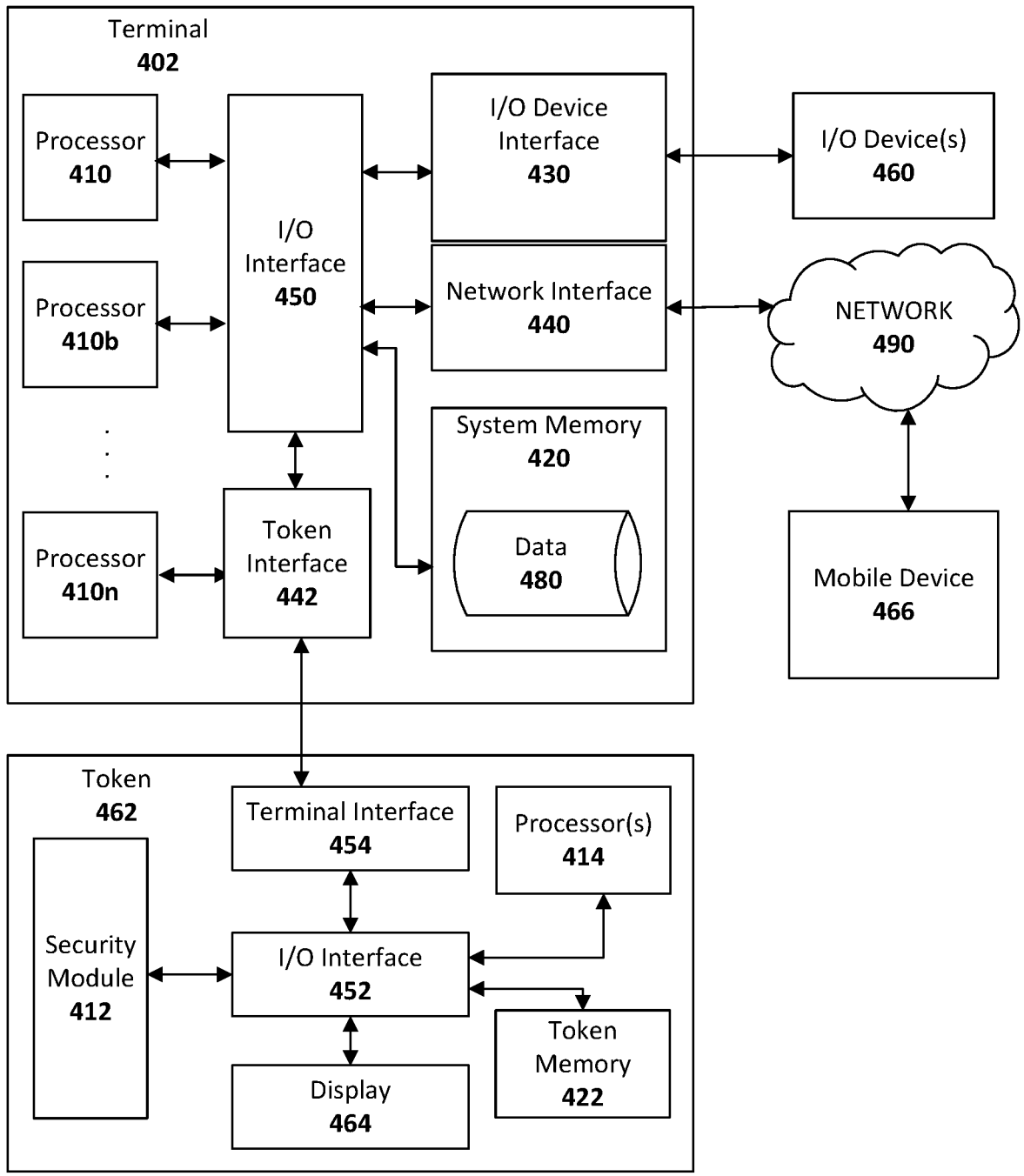
FIG. 4 shows illustrative components of a system that includes a token, in addition to a terminal and a mobile device connected to a network, in accordance with one or more embodiments.

FIG. 4 shows an example system for a terminal (e.g., computing system 400) that includes a token and a mobile device connected to a network, in accordance with one or more embodiments of this disclosure. A person skilled in the art would understand that those terms may be used interchangeably. The components of FIG. 4 may be used to perform some or all operations discussed in relation to FIGS. 1-3. Furthermore, various portions of the systems and methods described herein may include or be executed on one or more computer systems similar to terminal 402. Further, processes and modules described herein may be executed by one or more processing systems similar to that of terminal 402.

Computer system 400 may include terminal 402, which may interact with input/output (I/O) device(s) 460, token 462, and network 490. Network 490 may be connected to one or more devices, such as mobile device 466. Terminal 402 may include one or more processors (e.g., processors 410a-410n) coupled to system memory 420, an I/O device interface 430, a token interface 442, and a network interface 440 via an I/O interface 450. Token 462 may include terminal interface 454, processor(s) 414, I/O interface 452, security module 412, display 464, and/or token memory 422.

A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of terminal 402. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 420 or token memory 422). Terminal 402 may be a uni-processor system including one processor (e.g., processor 410a or processor(s) 414), or a multi-processor system including any number of suitable processors (e.g., 410a-410n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, for example, an FPGA (field-programmable gate array) or an ASIC (application-specific IC). Terminal 402 may include a plurality of computing devices (e.g., distributed computer systems) to implement various processing functions.

I/O device interface 430 may provide an interface for connection of one or more I/O devices 460 to terminal system 402. I/O devices may include devices that receive input (e.g., from a user) or output information (e.g., to a user). I/O devices 460 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 460 may be connected to terminal system 402 through a wired or wireless connection. I/O devices 460 may be connected to terminal system 402 from a remote location. I/O devices 460 located on remote computer systems, for example, may be connected to terminal system 402 via a network and network interface 440.

Network interface 440 may include a network adapter that provides for connection of terminal system 402 to a network. Network interface 440 may facilitate data exchange between terminal system 402 and other devices connected to the network. Network interface 440 may support wired or wireless communication. The network may include an electronic communication network, such as the Internet, a local area network (LAN), a wide area network (WAN), a cellular communications network, or the like.

System memory 420 and/or token memory 422 may be configured to store program instructions or data 480. Program instructions may be executable by a processor (e.g., one or more of processors 410a-410n or 414) to implement one or more embodiments of the present techniques. Program instructions may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 420 and/or token memory 422 (e.g., storage device 316) may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. Non-transitory, computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 420 may include a non-transitory, computer-readable storage medium that may have program instructions stored thereon that are executable by a computer processor (e.g., one or more of processors 410a-410n) to cause the subject matter and the functional operations described herein. A memory (e.g., system memory 420) may include a single memory device and/or a plurality of memory devices (e.g., distributed memory devices).

The system may use security modules, such as security module 412. In disclosed embodiments, a "security module" may include a device that safeguards and manages digital keys and performs encryption and/or decryption functions for digital signatures, strong authentication, and other cryptographic features. A hardware security module may include a physical computing device that operates as such. In some embodiments, the hardware security module may reside on a server (e.g., a server connected to network 490) or a mobile device (e.g., mobile device 466), and may transmit and/or receive data from token 462 and/or terminal 402. A hardware security module may enable onboard secure cryptographic key generation, storage, key management, encryption/signature functions, and offloading application servers for asymmetric and symmetric cryptography. In some embodiments, a security module may generate updated authentication data and associated token data, including CVVs, PINs, or card keysets. Security module 412 may interact, via I/O interface 452, with other components within token 462, such as processor(s) 414, token memory 422, display 464, or terminal interface 454. By including a security module in the token, the system may enable the secure generation of authentication data using public keys associated with the token and/or issuer of the token. By doing so, the system may not have to store all possible future authentication data in a storage device but may generate these when needed. Thus, hardware security modules may provide improved security and tamper resistance when compared to a payment card with stored authentication data, as sensitive data may not be directly stored on the card. Additionally, new data (e.g., updated authentication data) may be updated even when disconnected from a terminal or network, improving the portability of the token.

I/O interface 450 may be configured to coordinate I/O traffic between processors 410a-410n, system memory 420, network interface 440, I/O devices 460, and/or other peripheral devices. I/O interface 452 may be configured to coordinate I/O traffic between processor(s) 414, token memory 422, security module 412, display 462 and/or other devices in the token. I/O interface 450 and/or I/O interface 452 may perform protocol, timing, or other data transformations to convert data signals from one component (e.g., system memory 420 or token memory 422) into a format suitable for use by another component (e.g., processors 410a-410n or processor(s) 414). I/O interface 450 may include support for devices attached through various types of peripheral buses, such as a variant of the Peripheral Component Interconnect (PCI) bus standard or the Universal Serial Bus (USB) standard.

Terminal 402 may include token interface 442, which may provide a method to send and receive information from tokens attached to the terminal. In some embodiments, token interface 442 may include an IC chip reader, such as in credit card terminals or points-of-sale. In some embodiments, token interface 442 may interface with contacts on an IC card (e.g., a smart chip or an EMV chip) on token 462 and may process information to provide to processors 410n or I/O interface 450. Token 462 may include terminal interface 454, which may provide a method to send and receive information from the terminal when attached (or when interfacing wirelessly). In some embodiments, terminal interface 454 may interface with contacts in a chip reader on the terminal to receive or send information from the terminal.

Embodiments of the techniques described herein may be implemented using a single instance of terminal system 402, or multiple terminal systems 402 configured to host different portions or instances of embodiments. Multiple terminal systems 402 may provide for parallel or sequential processing/execution of one or more portions of the techniques described herein.

Those skilled in the art will appreciate that terminal system 402 is merely illustrative and is not intended to limit the scope of the techniques described herein. Terminal system 402 may include any combination of devices or software that may perform or otherwise provide for the performance of the techniques described herein. For example, terminal system 402 may include or be a combination of a cloud computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Terminal system 402 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

The system may include a terminal, such as terminal 402. In disclosed embodiments, a terminal may refer to any device that may interface with a card. In disclosed embodiments, a "point-of-sale" or "payment terminal" may include a device that interfaces with a payment card in order to make electronic funds transfers. A payment terminal may include a keypad for entering PINs, a screen and a means for capturing information from payment cards, such as a chip reader, an NFC transmitter and receiver, or a magnetic stripe reader. The payment terminal may interface with an electronic payment system or another network and may communicate with an issuer of the token or another trusted entity.

In some embodiments, the terminal may include a terminal location. In disclosed embodiments, a "terminal location" may refer to a physical location (e.g., an address, a political region or another geographical indicator), a virtual location (e.g., an Internet Protocol (IP) address), or a combination. In some embodiments, the system may update authentication data based on, for example, terminal location.

For example, the system may rotate authentication details or token data based on whether a user has changed locations. By doing so, the system reduces the risk of fraud or theft in situations where, for example, a fraudulent actor may attempt to be authenticated in a different geographic region.

The system may initiate a communication session, such as between terminal 402 and token 462. In disclosed embodiments, a "communication session" may include any link, interaction, or communication between two devices. For example, a communication session may include sharing of information (e.g., encrypted and/or unencrypted) between a token and a terminal and/or vice versa. A communication session may include, for example, sharing of authentication data, token data, or other information relating to the token between servers and/or networks (e.g., payment networks) and a token, via a terminal or mobile device. In some embodiments, a communication session may include a transaction, such as for a purchase or an exchange of funds. The system may detect the end of a communication session and, in response, may rotate authentication data. By doing so, any further transactions may require the new, updated authentication data, thereby mitigating the risk of further deleterious consequences due to any security breach in the current communication session.

The system may receive and/or process a signal voltage. In disclosed embodiments, a "signal voltage" may include an electrical indicator used to communicate a condition or a message. For example, a signal voltage may include a voltage that corresponds to the end of a communication session (e.g., a voltage of near 0, or a specific voltage given by the terminal to signal the end of a successful or unsuccessful transaction with respect to the token). The signal voltage may be detected by monitoring the power or currents transmitted to the token, for example. The system may utilize a voltage threshold in order to determine the signal voltage. In disclosed embodiments, a "voltage threshold" may include one or a range of values of voltages corresponding to a condition for signaling the termination of a communication session. For example, the terminal may transmit a signal voltage with a predetermined value at the end of a communication session. In turn, the token may determine whether a voltage received from the terminal may be within two values that surround this predetermined value (e.g., between a first voltage threshold and a second voltage threshold) in order to determine whether the received voltage is indeed a signal voltage. By doing so, the system may detect and validate the end of a communication session, to prevent updating authentication data prematurely and, thus, to mitigate errors during the communication session.

The system may generate a refresh signal. In disclosed embodiments, a "refresh signal" may include a communication to refresh (e.g., update) authentication data. For example, the token and/or system may transmit a refresh signal to a security module upon detection of the completion of a communication session. A refresh signal may include a voltage or pattern of voltages or electrical signals that may be predetermined, such that a security module may update authentication data in response. By utilizing a refresh signal, the system may signal to the security module when to generate updated authentication data (e.g., through an algorithm for generating further encrypted authentication data), thereby preventing a premature update while enabling rotation of authentication data when required or desired.

The system may determine a system clock setting. In disclosed embodiments, a "system clock setting" may include a marker of a time of an event taking place that is standardized across a system, such as a network or across devices. In some embodiments, the system may rotate or update authentication data based on the system clock setting. For example, the system may determine that the token data may be refreshed on the first minute of every day. By utilizing temporal information that is standardized across time as a condition for updating authentication data, the token may rotate this data in a manner that allows the network (e.g., the token issuer) to synchronize authentication data, so that this authentication data may be easily verified by an external party. Thus, authentication data may be compared directly with expected authentication data, enabling simple verification of the token's updated authentication data by another device on the network.

Figure 5:
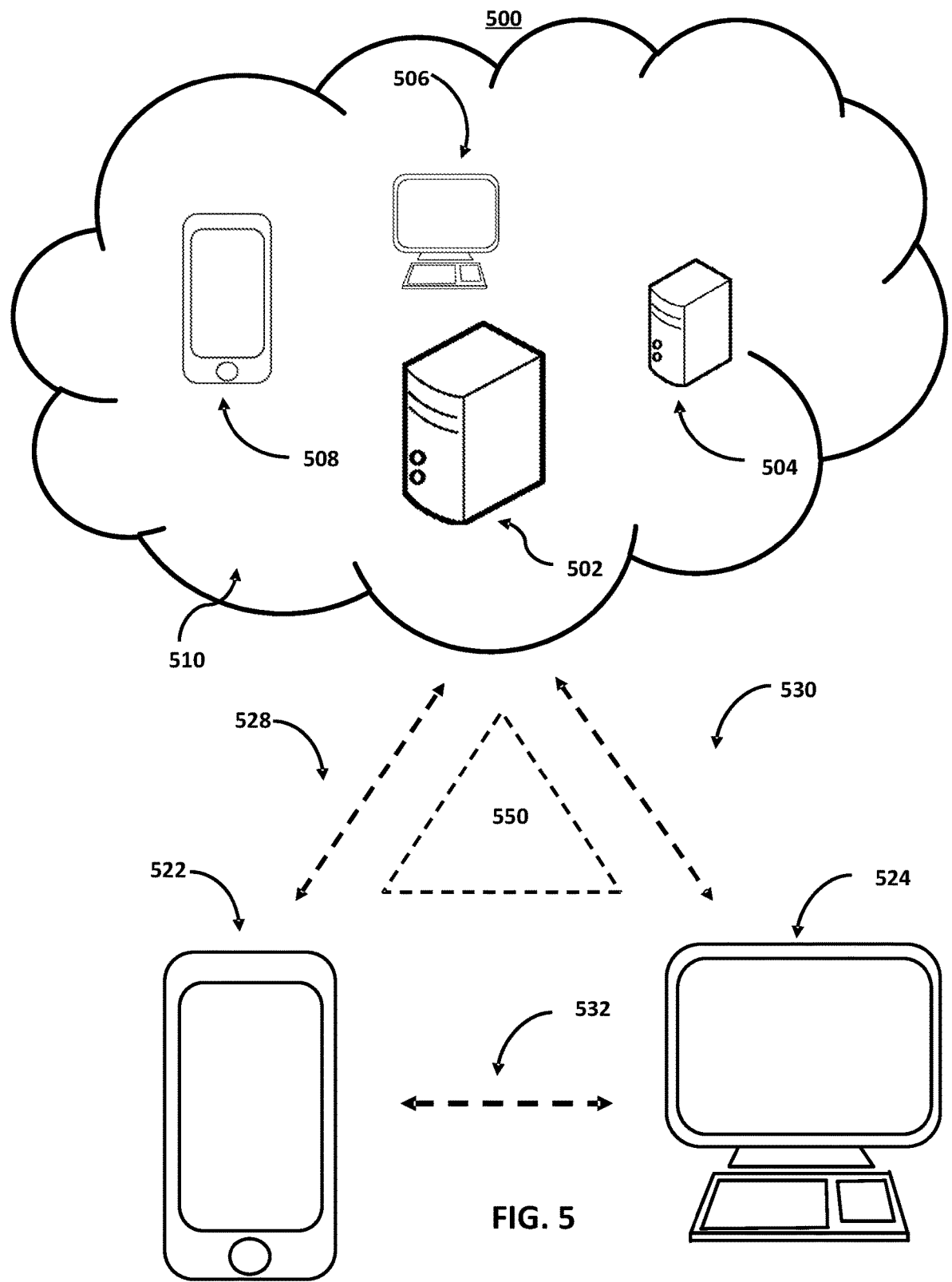
FIG. 5 shows illustrative components of a system that enables communication between a terminal, a mobile device, and a server, in accordance with one or more embodiments.

FIG. 5 shows illustrative components for a system used to authenticate communication sessions with a token at a terminal, in accordance with one or more embodiments. For example, FIG. 5 may show illustrative components for mitigating misuse and theft of credentials by rotating authentication details following communication session termination. As shown in FIG. 5, system 500 may include mobile device 522 and terminal 524. While shown as a smartphone and personal computer, respectively, in FIG. 5, it should be noted that mobile device 522 and terminal 524 may be any computing device, including, but not limited to, a laptop computer, a tablet computer, a handheld computer, and other computer equipment (e.g., a server), including "smart," wireless, wearable, and/or mobile devices.

FIG. 5 also includes cloud components 510. For example, cloud components 510 may include or connect to a network (e.g., a payment network) or a server. Cloud components 510 may alternatively be any computing device as described above, and may include any type of mobile terminal, fixed terminal, or other device. For example, cloud components 510 may be implemented as a cloud computing system and may feature one or more component devices. It should also be noted that system 500 is not limited to three devices. Users may, for instance, utilize one or more devices to interact with one another, one or more servers, or other components of system 500. For example, cloud components 510 may include servers 502 or 504, as well as user devices 508 or 506. It should be noted that, while one or more operations are described herein as being performed by particular components of system 500, these operations may, in some embodiments, be performed by other components of system 500. As an example, while one or more operations are described herein as being performed by components of mobile device 522, these operations may, in some embodiments, be performed by components of cloud components 510. In some embodiments, the various computers and systems described herein may include one or more computing devices that are programmed to perform the described functions. Additionally, or alternatively, multiple users may interact with system 500 and/or one or more components of system 500. For example, in one embodiment, a first user and a second user may interact with system 500 using two different components.

With respect to the components of mobile device 522, terminal 524, and cloud components 510, each of these devices may receive content and data via I/O paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 5, both mobile device 522 and terminal 524 include a display upon which to display data (e.g., conversational response, queries, and/or notifications).

Additionally, as mobile device 522 and terminal 524 are shown as a smartphone and personal computer, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 500 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 5 also includes communication paths 528, 530, and 532. Communication paths 528, 530, and 532 may include the Internet, a mobile phone network, a mobile voice or data network (e.g., a 5G or LTE network), a cable network, a public switched telephone network, or other types of communications networks or combinations of communications networks. Communication paths 528, 530, and 532 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 510 may include servers, computing devices, local area networks, or mobile devices. For example, cloud components 510 may include servers 502 or 504, as well as user devices 508 or 506. Cloud components 510 may access one or more blockchain networks. Additionally, cloud components 510 may access authentication data and/or receive authentication data. For example, cloud components 510 may access encrypted authentication information and may possess an associated key for decryption and validation of the authentication data.

Cloud components 510 may include a model, which may be a machine learning model, artificial intelligence model, deep learning model, etc. (which may be referred collectively as "models" herein). The model may take inputs and provide outputs. The inputs may include multiple datasets, such as a training dataset and a test dataset. Each of the plurality of datasets (e.g., inputs) include data subsets related to user data, predicted forecasts and/or errors, and/or actual forecasts and/or errors. In some embodiments, outputs may be fed back to the model as input to train the model (e.g., alone or in conjunction with user indications of the accuracy of outputs, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., whether an authentication data may be authenticated).

In a variety of embodiments, the model may update its configurations (e.g., weights, biases, or other parameters) based on the assessment of its prediction (e.g., outputs) and reference feedback information (e.g., user indication of accuracy, reference labels, or other information). In a variety of embodiments where the model is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model may be trained to generate better predictions.

In some embodiments, the model may include an artificial neural network. In such embodiments, the model may include an input layer and one or more hidden layers. Each neural unit of the model may be connected with many other neural units of the model. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. The model may be self-learning and trained, rather than explicitly programmed, and can perform significantly better in certain areas of problem solving, as compared to traditional computer programs. During training, an output layer of the model may correspond to a classification of the model, and an input known to correspond to that classification may be input into an input layer of the model during training. During testing, an input without a known classification may be input into the input layer, and a determined classification may be output. In some embodiments, the model may include multiple layers (e.g., where a signal path traverses from front layers to back layers). In some embodiments, back propagation techniques may be utilized by the model where forward stimulation is used to reset weights on the "front" neural units. In some embodiments, stimulation and inhibition for the model may be more free-flowing, with connections interacting in a more chaotic and complex fashion. During testing, an output layer of the model may indicate whether or not a given input corresponds to a classification of the model (e.g., whether a communication session is suspicious or fraudulent).

In some embodiments, the model may automatically perform actions based on outputs. In some embodiments, the model may not perform any actions. The output of the model may be used to determine whether to rotate and/or update authentication data and associated token data in order to prevent further misuse or fraud.

System 500 also includes API layer 550. API layer 550 may allow the system to generate summaries across different devices. In some embodiments, API layer 550 may be implemented on mobile device 522 or terminal 524. Alternatively or additionally, API layer 550 may reside on one or more of cloud components 510. API layer 550 (which may be A REST or Web services API layer) may provide a decoupled interface to data and/or functionality of one or more applications. API layer 550 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 550 may use various architectural arrangements. For example, system 500 may be partially based on API layer 550, such that there is strong adoption of SOAP and RESTful Web services, using resources like Service Repository and Developer Portal, but with low governance, standardization, and separation of concerns. Alternatively, system 500 may be fully based on API layer 550, such that separation of concerns between layers like API layer 550, services, and applications are in place.

In some embodiments, the system architecture may use a microservice approach. Such systems may use two types of layers: Front-End Layer and Back-End Layer where microservices reside. In this kind of architecture, the role of the API layer 550 may provide integration between Front-End and Back-End. In such cases, API layer 550 may use RESTful APIs (exposition to front-end or even communication between microservices). API layer 550 may use AMQP (e.g., Kafka, RabbitMQ, etc.). API layer 550 may use incipient usage of new communications protocols such as gRPC, Thrift, etc.

In some embodiments, the system architecture may use an open API approach. In such cases, API layer 550 may use commercial or open source API platforms and their modules. API layer 550 may use a developer portal. API layer 550 may use strong security constraints applying WAF and DDOS protection, and API layer 550 may use RESTful APIs as standard for external integration.

Figure 6:
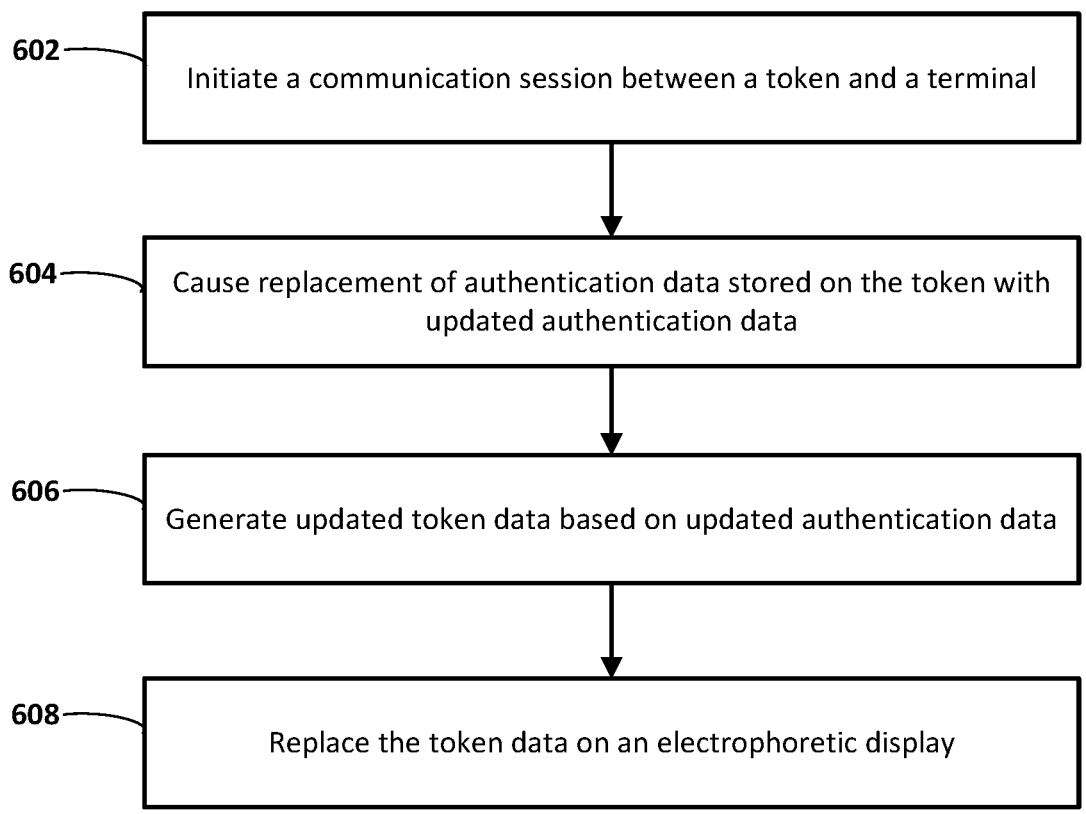
FIG. 6 shows a flowchart of the steps involved in generating and replacing authentication data, in response to termination of a communication session, for display on an electrophoretic display, in accordance with one or more embodiments.

FIG. 6 shows a flowchart of the steps involved in generating and replacing authentication data in response to termination of a communication session, for display on an electrophoretic display, in accordance with one or more embodiments. For example, using circuitry associated with the token, the system may use process 600 (e.g., as implemented on one or more system components described) in order to generate and replace authentication data with updated authentication data after completion of a communication session, thereby mitigating fraud and theft of authentication data for users of tokens such as payment cards.

At step 602, process 600 (e.g., using one or more components described above) may initiate a communication session between a token and a terminal. That is, the system may initiate a communication session between the token and the terminal during which authentication data stored on the token may be transmitted to the terminal, the token presenting token data on the electrophoretic display. For example, the system may initiate a session for authentication of the token, such as for payment or to complete another type of transaction. The token may be inserted, for example, into a point-of-sale device or may be "tapped" on an NFC antenna for initiation, and communication may occur between token interface 442 on the terminal and terminal interface 454 on the token. During the communication session, the electrophoretic display may present token data (e.g., relating to authentication). By initiating a communication session, the system may enable a user to complete a task (e.g., a purchase or another user identification/authentication task) based on token data encoded within the token. This token data may also be displayed on an electrophoretic display such that a user may use alternative authentication methods (e.g., manual input of authentication details into the terminal). Thus, the system may enable authentication of the user through initiation of the communication session and display of the relevant token data.

At step 604, process 600 (e.g., using one or more components described above) may cause replacement of authentication data stored on the token with updated authentication data. That is, after completion of the communication session with the terminal, the system may cause replacement of the authentication data stored on the token with updated authentication data. For example, terminal 402 may receive encrypted authentication data from token 462 through token interface 442 and send this information to a server (e.g., managed by an issuer of the token) on network 490. In some embodiments, a server on network 490 may validate this authentication data (e.g., through use of a public or private key) and send back a validation message through network interface 440 to terminal 402. Once the authentication process is complete, the system may determine that the communication session may be terminated and, upon this termination, the token may replace the authentication data with updated authentication data. By doing so, the system may prevent theft and further misuse of the previous authentication details by requiring further communication sessions to utilize updated authentication information instead. Thus, the system mitigates the risk of fraudulent behavior through refreshing authentication data.

In some embodiments, the system may replace the authentication data on the token with the updated authentication data based on a refresh signal to a security module and receiving this updated authentication data from the security module. That is, the system may transmit a refresh signal to a security module (e.g., security module 412) based on detecting completion of the communication session. Based on the refresh signal, the system may receive the updated authentication data, via the security module, wherein the updated authentication data is generated based on a private key stored on the security module. The system may replace the authentication data on the token with the updated authentication data. For example, processor(s) 414 may, through I/O interface 452, send a command to generate new (e.g., updated) authentication details to security module 412. I/O interface 452 may receive from security module 412, in turn, updated authentication data. This updated authentication data may, in some embodiments, be generated based on a private key held on the security module, which may then replace the original authentication data (e.g., within token memory 422). By encrypting the generated authentication data with a private key, security module 412 ensures that this information was generated by the token itself, and not falsified by a malicious entity or actor. The generation of updated authentication data in response to the refresh signal ensures that this information is refreshed within the token upon completion of a communication session with the terminal, such that this updated, secure information is required prior to any further transactions. By doing so, the system mitigates the risk of theft of authentication data as well as further fraudulent transactions using the original authentication data.

In some embodiments, detecting the completion of the communication session may include receiving a signal voltage from the terminal and determining the completion of the communication session based on this signal voltage. That is, token 462 may receive, from terminal 402 (e.g., through terminal interface 454), a signal voltage corresponding to the completion of the completion session. The system may determine (e.g., through processor(s) 414) that the communication session is completed based on the signal voltage, wherein the signal voltage is between a first voltage threshold and a second voltage threshold. For example, terminal 402 (e.g., through token interface 442), may output a signal voltage corresponding to a particular voltage value at the end of the communication session. In some embodiments, this particular voltage may be predetermined or preprogrammed. Additionally or alternatively, the particular voltage transmitted by the terminal may be one that is characteristic of the end of the session (e.g., a voltage of 0 or a flatline). In response to receiving a voltage, token 462 may determine if it corresponds to the signal voltage by determining whether this voltage falls within two threshold voltages (e.g., the first voltage threshold and the second voltage threshold). By doing so, the system may determine whether the voltage corresponds to a signal voltage and, thus, may determine that the communication session has terminated. By determining the end of a communication session, the system may ensure that any updating of the authentication data occurs only after a communication session (e.g., a transaction) is completed. By doing so, the system may reduce the risk of communication errors due to dynamic updating of authentication details during a transaction. Nevertheless, the system may still be allowed to update authentication details following the end of the communication session, thereby mitigating the risk of fraud due to theft of the original authentication details. Thus, in receiving a signal voltage, the system may improve confidence and accuracy in its determination of the end of a communication session.

In some embodiments, detecting the completion of the communication session may include detecting that the token is no longer being powered by the terminal. For example, processor(s) 414 may determine that no power is being received at terminal interface 454, for example (e.g., that a voltage of 0 is being received). In response to this determination, the system may, as described above, update the authentication details for the token using security module 412, for example. The processors and security module may still operate even with no power from terminal 402, through the inclusion of an energy storage device, such as a capacitor or supercapacitor. By detecting the end of a communication session through a lull in received power from the terminal, the system may ensure that authentication data is updated even in the event of an interrupted communication session (e.g., premature removal from the terminal), which ensures that authentication data is rotated and, therefore, that fraud mitigation is still possible, even with incomplete communication sessions or transactions.

In some embodiments, the system may cause replacement of authentication data even if unpowered by the terminal. That is, replacement of the authentication data may occur while the circuitry is powered by the capacitor and the capacitor is no longer being powered by the terminal. For example, after completion of the communication session, a user may remove the token from the token interface, thereby cutting off any power supply to the token itself. By receiving power from the capacitor, the circuitry within the token may still operate even when the token is removed. By doing so, the system may still react to the completion of the communication session and update authentication data accordingly for fraud mitigation purposes. Because the electrophoretic display and authentication data update may only require fleeting power (due to the non-volatility of both the display and the token memory), the system may utilize capacitor power to complete these actions, and the token may continue to be operable even after capacitor depletion for further transactions with or without a terminal.

In some embodiments, the system may update authentication data based on a system clock setting. That is, the system may retrieve from the terminal, through token interface 442, a system clock setting. Based on the system clock setting, the system may cause the replacement of the authentication data with the updated authentication data. For example, the terminal may provide a timestamp of the communication session based on a system time (e.g., a time that has been determined by a National Institute of Standards and Technologies (NIST) atomic clock and is universally followed throughout the network). Based on this timestamp, the system may determine whether or not to update authentication data. For example, the system may update authentication data depending on whether the system clock setting is more than 24 hours later than for a previous communication session. By doing so, the system may ensure that the token's authentication data is updated regularly enough such that fraud or misuse may be prevented.

In some embodiments, the system may update authentication data based on a terminal location. That is, the system may retrieve a terminal location from the terminal (e.g., through terminal interface 454). Based on the terminal location, the system may cause the replacement of the authentication data with the updated authentication data. For example, the system may receive an indication of location (e.g., a GPS coordinate, a physical address, a physical region, or an IP address) from the terminal. Based on this location, the system may determine that it may update authentication data for security purposes. For example, if a communication session (e.g., a transaction or a purchase) occurs at a terminal that is far away from a recent, prior transaction, the system may determine that it may be fraudulent and, in response, it may replace the authentication data immediately to prevent further misuse or fraud. In some embodiments, the system may determine a distance between prior transactions and compare this distance with a threshold distance, before determining whether to cause the replacement of the authentication data. By doing so, the system may react to unexpected changes in a token's location and protect the user from any related misuse or fraud.

In some embodiments, the system may update authentication data based on authentication data arising from a mobile device. That is, after completion of the communication session with the terminal, the system may transmit a request for the updated authentication data to a mobile device (e.g., mobile device 466). In response to the request, the system may receive the updated authentication data from the mobile device. For example, following completion of a transaction or purchase, users may determine that they may be under increased risk of fraud (e.g., they are in an unsafe region of the world, or have visited a suspicious terminal). In response, a user, through the token, may request for updated authentication data and receive this data from a mobile device (e.g., through an NFC coil). By doing so, the system may update authentication data on demand, improving the security of the token, as the decision to update authentication data may be in the user's hands. Additionally, the system may receive updated authentication data from a mobile device that is connected to a network (e.g., network 490) and communicating with, for example, the issuer of the token. By doing so, the system may receive security updates or may synchronize authentication data on the token with authentication data generated and/or stored externally, thereby improving the flexibility of generating authentication data for the token.

At step 606, process 600 (e.g., using one or more components described above) may generate updated token data based on updated authentication data. For example, the system may utilize the authentication data received at the token or generated by the security module in order to determine token data, such as a private account number, CVV, and/or expiration date values (e.g., by receiving and/or generating decrypted authentication data from the security module or from the terminal and/or associated servers). While authentication data itself may include many fields such as security codes and may be encrypted, token data may be in a human-readable format (e.g., a string of numbers), which may be useful for validating card details manually. For example, token data may be utilized for online transactions where the token may not be physically attached to a terminal. Thus, by producing updated token data from updated authentication data, the system improves flexibility in how to authenticate the token's information. Additionally, because the system may update authentication data, the token data may be updated in response, thereby improving fraud mitigation capabilities for the token.

At step 608, process 600 (e.g., using one or more components described above) may replace the token data on the electrophoretic display. That is, the system may replace the token data on the electrophoretic display with the updated token data by updating the electrophoretic display to present the updated token data while the electrophoretic display is powered by the capacitor. For example, the system may transmit the updated token data to an IC associated with the electrophoretic display in order to cause the updated token data to be displayed on the electrophoretic display (e.g., by pooling the ink capsules within the display and causing visual contrast). While generating the image of the updated token data on the display may require power (e.g., through the capacitor), in some embodiments, the system may continue displaying the updated token data even when completely unpowered by the capacitor, owing to the static nature of some electrophoretic displays. Additionally, because electrophoretic displays do not require significant power for updating, the replacement process may be accomplished using power from an energy storage device on the token (e.g., a capacitor or supercapacitor), without relying on terminal power. Thus, the system may replace the token data on the electrophoretic display even when unpowered. By doing so, the system enables authentication of token data even when disconnected from the terminal, while ensuring that the token data displayed on the token is updated to be consistent with any updated token data or authentication data stored within the token. By doing so, the system ensures consistency and security with regard to authentication credentials associated with the token, thereby solidifying the fraud mitigation capabilities of the token.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising initiating a communication session between a token and a terminal during which authentication data stored on the token is transmitted to the terminal, the token presenting token data on a display; after completion of the communication session with the terminal, causing replacement of the authentication data stored on the token with updated authentication data; generating updated token data based on the updated authentication data; and replacing the token data on the display with the updated token data by updating the display to present the updated token data while the display is powered by an energy storage device.

2. The method of any one of the preceding embodiments, further comprising: transmitting a refresh signal to a security module based on detecting completion of the communication session; receiving, based on the refresh signal, via the security module, the updated authentication data, wherein the updated authentication data is generated based on a private key stored on the security module; and replacing the authentication data on the token with the updated authentication data.

3. The method of any one of the preceding embodiments, wherein detecting the completion of the communication session comprises: receiving, from the terminal, a signal voltage corresponding to the completion of the communication session; and determining that the communication session is completed based on the signal voltage, wherein the signal voltage is between a first voltage threshold and a second voltage threshold.

4. The method of any one of the preceding embodiments, wherein detecting the completion of the communication session comprises detecting that the token is no longer being powered by the terminal.

5. The method of any one of the preceding embodiments, further comprising: retrieving, from the terminal, a system clock setting; and causing, based on the system clock setting, the replacement of the authentication data with the updated authentication data.

6. The method of any one of the preceding embodiments, further comprising: retrieving, from the terminal, a terminal location; and causing, based on the terminal location, the replacement of the authentication data with the updated authentication data.

7. The method of any one of the preceding embodiments, the token further comprising a button connected to a piezoelectric element configured to generate, upon activation of the button, an output voltage that triggers the replacement of the authentication data, wherein the replacement of the authentication data with the updated authentication data is based on the generation of the output voltage.

8. The method of any one of the preceding embodiments, wherein the activation of the button further causes the electrophoretic display to be updated to present the updated token data while the electrophoretic display is powered by the energy storage device.

9. The method of any one of the preceding embodiments, wherein the replacement of the authentication data occurs while (i) the circuitry is powered by the energy storage device and (ii) the energy storage device is no longer being powered by the terminal.

10. The method of any one of the preceding embodiments, further comprising: after completion of the communication session with the terminal, transmitting, to a mobile device, a request for the updated authentication data; and in response to the request, receiving, from the mobile device, the updated authentication data.

11. The method of any one of the preceding embodiments, wherein the energy storage device comprises a supercapacitor configured to provide power to the electrophoretic display when the token is disconnected from the terminal.

12. A hardware security module (HSM) card configured with a post-session triggering mechanism to generate and replace data displayed and stored on the HSM card after a communication session with a card processing terminal even when the card processing terminal is no longer powering the HSM card, the HSM card comprising: an HSM configured to store a private key and generate authentication data based on the private key; a capacitor configured to receive power wirelessly from a terminal, store power, and provide power to components of the HSM card; an electrophoretic display configured to present card data; and circuitry configured to perform operations comprising: initiating, while the electrophoretic display is not powered by the capacitor and is displaying the card data, the communication session between the HSM card and the terminal during which the authentication data is transmitted to the terminal; in response to completion of the communication session with the terminal, transmitting, to the HSM, a refresh signal indicating refreshing the authentication data to cause the HSM to generate and replace the authentication data with updated authentication data, wherein the updated authentication data is generated by the HSM based on the private key; in response to obtaining the updated authentication data from the HSM in connection with the refresh signal, generating updated card data based on the updated authentication data; replacing the card data on the electrophoretic display with the updated card data by causing the capacitor to power the electrophoretic display and updating the electrophoretic display to present the updated card data while (i) the electrophoretic display is powered by the capacitor and (ii) the capacitor is no longer being powered by the terminal; and in response to completion of updating the electrophoretic display, causing the capacitor to stop powering the electrophoretic display, thereby maintaining presentation of the updated card data on the electrophoretic display and reserving power in the capacitor.

13. A tangible, non-transitory, machine-readable medium storing instructions that, when executed by a data processing apparatus, cause the data processing apparatus to perform operations comprising those of any of embodiments 1-11.

14. A token comprising: a capacitor configured to receive power from a terminal, store power, and provide power to components of the token; an electrophoretic display configured to present token data; and circuitry configured to perform operations comprising those of any of embodiments 1-11.

15. A system comprising one or more processors; and memory storing instructions that, when executed by the processors, cause the processors to effectuate operations comprising those of any of embodiments 1-11.

16. A system comprising means for performing any of embodiments 1-11.

What is claimed is:

1. A hardware security module (HSM) token configured with a post-session triggering mechanism to generate and replace data displayed and stored on the HSM token after a communication session with a token processing terminal even when the token processing terminal is no longer powering the HSM token, the HSM token comprising:
an HSM configured to store a private key and generate authentication data based on the private key;
a capacitor configured to receive power wirelessly from a terminal, store power, and provide power to components of the HSM token;
an electrophoretic display configured to present token data; and
circuitry configured to perform operations comprising:
initiating, while the electrophoretic display is not powered by the capacitor and is displaying the token data, the communication session between the HSM token and the terminal during which the authentication data is transmitted to the terminal;
in response to completion of the communication session with the terminal, transmitting, to the HSM, a refresh signal indicating refreshing the authentication data to cause the HSM to generate and replace the authentication data with updated authentication data, wherein the updated authentication data is generated by the HSM based on the private key;
in response to obtaining the updated authentication data from the HSM in connection with the refresh signal, generating updated token data based on the updated authentication data;
replacing the token data on the electrophoretic display with the updated token data by causing the capacitor to power the electrophoretic display and updating the electrophoretic display to present the updated token data while (i) the electrophoretic display is powered by the capacitor and (ii) the capacitor is no longer being powered by the terminal; and
in response to completion of updating the electrophoretic display, causing the capacitor to stop powering the electrophoretic display, thereby maintaining presentation of the updated token data on the electrophoretic display and reserving power in the capacitor.

2. A token comprising:
a capacitor configured to receive power from a terminal, store power, and provide power to components of the token;

an electrophoretic display configured to present token data; and circuitry configured to perform operations comprising:

initiating a communication session between the token and the terminal during which authentication data stored on the token is transmitted to the terminal, the token presenting the token data on the electrophoretic display;

based on detecting completion of the communication session with the terminal, causing replacement of the authentication data by (1) transmitting a signal to a security module, (2) receiving updated authentication data based on the signal, wherein the updated authentication data is generated based on a key stored on the security module, and (3) replacing the authentication data stored on the token with the updated authentication data;

generating updated token data based on the updated authentication data; and replacing the token data on the electrophoretic display with the updated token data by updating the electrophoretic display to present the updated token data while the electrophoretic display is powered by the capacitor.

3. The token of claim 2, wherein detecting the completion of the communication session comprises:

receiving, from the terminal, a signal voltage corresponding to the completion of the communication session; and determining that the communication session is completed based on the signal voltage, wherein the signal voltage is between a first voltage threshold and a second voltage threshold.

4. The token of claim 2, wherein detecting the completion of the communication session comprises detecting that the token is no longer being powered by the terminal.

5. The token of claim 2, the operations further comprising:

retrieving, from the terminal, a system clock setting; and causing, based on the system clock setting, the replacement of the authentication data with the updated authentication data.

6. The token of claim 2, the operations further comprising:

retrieving, from the terminal, a terminal location; and causing, based on the terminal location, the replacement of the authentication data with the updated authentication data.

7. The token of claim 2, further comprising a button connected to a piezoelectric element configured to generate, upon activation of the button, an output voltage that triggers the replacement of the authentication data, wherein the replacement of the authentication data with the updated authentication data is based on a generation of the output voltage.

8. The token of claim 7, wherein the activation of the button further causes the electrophoretic display to be updated to present the updated token data while the electrophoretic display is powered by the capacitor.

9. The token of claim 2, wherein the replacement of the authentication data occurs while (i) the circuitry is powered by the capacitor and (ii) the capacitor is no longer being powered by the terminal.

10. The token of claim 2, the operations further comprising:

after the completion of the communication session with the terminal, transmitting, to a mobile device, a request for the updated authentication data; and in response to the request, receiving, from the mobile device, the updated authentication data.

11. The token of claim 2, wherein the capacitor is a supercapacitor configured to provide power to the electrophoretic display when the token is disconnected from the terminal.

12. A non-transitory, computer-readable medium storing instructions that, when executed by one or more processors, cause operations comprising:

initiating a communication session between a token and a terminal during which authentication data stored on the token is transmitted to the terminal, the token presenting token data on a token display;

based on detecting completion of the communication session with the terminal, causing replacement of the authentication data by (1) transmitting a signal to a security module, (2) receiving updated authentication data based on the signal, wherein the updated authentication data is generated based on a key stored on the security nodule, and (3) replacing the authentication data stored on the token with the updated authentication data;

generating updated token data based on the updated authentication data; and replacing the token data on the token display with the updated token data by updating the token display to present the updated token data while the token display is powered by an energy storage device.

13. The non-transitory, computer-readable medium of claim 12, wherein detecting the completion of the communication session comprises:

receiving, from the terminal, a signal voltage corresponding to the completion of the communication session; and determining that the communication session is completed based on the signal voltage, wherein the signal voltage is between a first voltage threshold and a second voltage threshold.

14. The non-transitory, computer-readable medium of claim 13, wherein detecting the completion of the communication session comprises detecting that the token is no longer being powered by the terminal.

15. The non-transitory, computer-readable medium of claim 12, the operations further comprising:

retrieving, from the terminal, a system clock setting; and causing, based on the system clock setting, the replacement of the authentication data with the updated authentication data.

16. The non-transitory, computer-readable medium of claim 12, the operations further comprising:

retrieving, from the terminal, a terminal location; and causing, based on the terminal location, the replacement of the authentication data with the updated authentication data.

17. The non-transitory, computer-readable medium of claim 12, wherein the replacement of the authentication data occurs while (i) circuitry in the token is powered by a capacitor and (ii) the capacitor is no longer being powered by the terminal.

18. The non-transitory, computer-readable medium of claim 12, the operations further comprising:

after the completion of the communication session with the terminal, transmitting, to a mobile device, a request for the updated authentication data; and in response to the request, receiving, from the mobile device, the updated authentication data.

* * * * *